2,992,899
PROCESS OF PRODUCING HYDROGEN PEROXIDE
Georg Manecke, Berlin-Wilmersdorf, Germany, assignor to Farbenfabriken Bayer Aktiengesellschaft, Leverkusen, Germany, a corporation of Germany
No Drawing. Filed July 9, 1957, Ser. No. 670,642
Claims priority, application Germany July 14, 1956
5 Claims. (Cl. 23—207)

The present invention relates to a convenient and economic process for producing hydrogen peroxide from solutions containing oxygen.

It is known to liberate oxygen-containing water from oxygen by treating the water with electron exchangers. Electron exchangers are either synthetic resins having an insoluble reversible redox system (Redoxite) or ion exchangers incorporated in the resin skeleton, to which ionogenous reversible redox systems are attached (Redox-Ion Exchangers) (see "Die Naturwissenschaften" 39 (1952), page 281 and "Angewandte Chemie" 66 (1954), page 143). It is further known to form hydrogen peroxide by reacting oxygen upon solutions of for instance anthra-hydroquinone or hydrazobenzene.

In accordance with the present invention it has surprisingly been found that hydrogen peroxide can be obtained in a simple, convenient and economic manner by filtering solutions containing oxygen through high molecular weight redox systems.

Suitable high molecular weight redox systems according to the invention are polymerisation resins or polycondensation resins having a redox system attached or incorporated by condensation or polymerisation. Redox systems of this type are for instance all compounds having an orthopara-quinoidal structure, hydroxy compounds, endiol compounds, compounds containing SH-groups, N-alkylated pyridine derivatives or leuco dyestuffs. Solvents which are suitable in the process of the invention are for instance water, hydrocarbons, halogenated hydrocarbons, alcohols, aldehydes, ketones, esters, organic phosphonates or mixtures thereof. Besides, solvents may be used which have no dissolving power for hydrogen peroxide. According to a preferred embodiment of the invention, the formation of hydrogen peroxide is favored by adding organic or inorganic stabilizers to the solutions containing oxygen. Stabilizers which are suitable for this purpose include sodium methaphosphate and 8-hydroxy quinoline, which are well known in the literature. (See W. Machu, "Das Wasserstoffperoxyd und die Perverbindungen," Wien, Springer-Verlag, 2nd edition 1951, page 195 seq.)

It is within the scope of the present invention to increase the hydrogen peroxide formation by adding catalysts, for instance copper sulphate.

It is of advantage to conduct the herein described process with solutions containing oxygen at a very high proportion. Solutions having an oxygen content as high as possible can be obtained for instance by saturating the solution with oxygen under pressure. When using solutions which are very rich in oxygen, it is preferable to carry out the process by filtering the solutions enriched with oxygen through the carriers of the redox systems which are incorporated in closed filters as they are used for instance in ion exchange processes. In order to obtain hydrogen peroxide in very high yields, it is of advantage to carry out the process at low temperatures. Besides, it has proved to be of advantage to saturate once more the hydrogen peroxide-solutions issuing from the filters with oxygen and to repass the solutions thus saturated through the redox systems. Before passing the solutions containing oxygen through the redox systems, it is necessary to convert the redox systems into the reduced state. This can be accomplished by treating the redox system with reducing substances for instance sodium dithionite, sodium sulphide, titanium trichloride or hydrogen.

As compared with the prior art processes of producing hydrogen peroxide by means of dissolved redox systems, the process of the present invention offers the considerable advantage that hydrogen peroxide solutions obtained can be used without any further processing operations. In contrast thereto the redox systems used in the conventional processes must be separated from the peroxide solutions. Regeneration of the highly polymeric redox systems according to the invention is substantially more simple than the previously used redox systems. For the purpose of regeneration the resins are treated according to the invention with a reducing agent, whereupon the reducing agent can be separated from the highly polymeric redox systems by merely washing. In the hitherto known processes the dissolved redox systems must be regenerated in a separate processing step, generally by way of catalytical hydrogenation. For this purpose the by-products formed in the production of hydrogen peroxide, such as ketones, acids, and aldehydes must previously be removed, since they contaminate the hydrogenation catalysts. Besides, the hydrogenation catalysts must be removed from the solutions after hydrogenation. Hence the new process is substantially more convenient and economic than the perior art methods of producing hydrogen peroxide from solutions containing oxygen.

The present invention is further illustrated by the following examples without being restricted thereto.

*Example 1*

A 5% titanium trichloride solution in 1 n-sulfuric acid is filtered through a filter charged with 350 g. of an insoluble resin prepared from hydroquinone and formaldehyde according to the process described in German Patent 972,626 or according to other known processes (particle size 0.3 mm., mesh size 2.8 cm. diameter, charging height about 70 cm.). The redox exchanger is reduced during filtration. The reducing agent is separated by washing with a 1 N sulfuric acid which has been freed from oxygen by boiling. The sulfuric acid is then washed out with water which has been freed from oxygen by boiling. Removal of oxygen from the washing liquid can be promoted by blowing in nitrogen.

750 ml. of a 0.1% methaphosphate solution which has been enriched with oxygen by passing through gaseous oxygen is filtered through the column pretreated as described above. After recycling for 23 hours and 0.023 N $H_2O_2$ solution has been formed. After another 72 hours the concentration of the peroxide has been increased to 0.1 N. By continuing the recycling operation the concentration can be increased up to 0.18 N. Thereafter, the column is exhausted and must be regenerated once more. The proportions of hydrogen peroxide in the solution can be further increased by saturating the solution again with oxygen and repumping the saturated solution over the reduced electron exchangers.

*Example 2*

Oxygen-free acetone is first passed through a filter which is charged with 350 g. of an insoluble resin prepared in known manner from hydroquinone and formaldehyde and converted into the reduced state by means of a regeneration agent, such as a 5% ammoniacal aqueous sodium hyposulfite solution, whereafter the wash water present in the filter from the regeneration step is replaced by acetone. 1 litre of a concentrated solution of oxygen is then passed through the filter. After the solution has passed the filter 20 times an 0.01 N $H_2O_2$ solution is obtained, while an 0.02 N solution results after the solution has passed the filter 50 times.

Further suitable redox resins are disclosed in German Auslegeschrift 1,005,734 and German application S 34,981 IVc/39c, published March 8, 1956.

What I claim is:

1. A process for the production of hydrogen peroxide solutions which comprises passing a concentrated solution of oxygen in a liquid solvent containing as a stabilizer a compound selected from the group consisting of sodium metaphosphate and 8-hydroxy quinoline through a filter bed charged with an electron-exchanging resin, said resin being a redox resin which is insoluble in said liquid solvent and prepared by the condensation of hydroquinone with formaldehyde, said resin containing in its molecule recurring units of hydroquinoidal structure, recovering as the filtrate a hydrogen peroxide solution, saturating the latter with oxygen, and recycling said solution through the filter bed, whereby said units of hydroquinoidal structure are converted into units of quinoidal structure and at least a portion of the dissolved oxygen is converted into the hydrogen peroxide.

2. Process of claim 1 wherein said electron-exchanging resin is a water-insoluble phenol formaldehyde resin containing recurring units of hydroquinoidal structure.

3. Process of claim 1 wherein said solution of oxygen contains as a catalyst a copper salt.

4. Process of claim 1 wherein said solution of oxygen is saturated with oxygen under superatmospheric pressure.

5. Process of claim 1 wherein the electron-exchanging resin becomes oxidized in the aforesaid process, and is reduced prior to the recycle step.

References Cited in the file of this patent

UNITED STATES PATENTS

| 2,158,525 | Riedl et al. | May 16, 1939 |
| 2,732,382 | Minsk et al. | Jan. 24, 1956 |
| 2,871,101 | Rust | Jan. 27, 1959 |
| 2,871,102 | Rust | Jan. 27, 1959 |

OTHER REFERENCES

Angewandte Chemie, vol. 67, 1955, 613–5.

Chemisches Zentrallblatt, vol. 128, January 1957, p. 50.

Richter: "Textbook of Organic Chemistry," 2nd edition, 1943, page 544.